United States Patent
Lai (10) Patent No.: US 7,108,498 B2
(45) Date of Patent: Sep. 19, 2006

(54) QUICK INSERT CHANGE SYSTEM FOR MULTI-MATERIAL PLASTIC INJECTION MOLDS

(75) Inventor: Yuk Shing Lai, Kowloon (HK)

(73) Assignee: CIM Precision Molds (HK) Limited, Kowloon (HK)

( * ) Notice: Subject to any disclaimer, the term of this patent is extended or adjusted under 35 U.S.C. 154(b) by 186 days.

(21) Appl. No.: 10/471,840

(22) PCT Filed: Mar. 14, 2002

(86) PCT No.: PCT/NZ02/00032

§ 371 (c)(1), (2), (4) Date: Sep. 15, 2003

(87) PCT Pub. No.: WO02/074513

PCT Pub. Date: Sep. 26, 2002

(65) Prior Publication Data

US 2004/0076701 A1    Apr. 22, 2004

(30) Foreign Application Priority Data

Mar. 15, 2001   (NZ) .................................... 510577

(51) Int. Cl.
*B29C 45/16*    (2006.01)

(52) U.S. Cl. ................... 425/190; 425/192 R; 425/576
(58) Field of Classification Search ............... 425/574, 425/575, 576, 190, 192 R
See application file for complete search history.

(56) References Cited

U.S. PATENT DOCUMENTS

| 4,959,002 | A | 9/1990 | Pleasant |
| 6,065,950 | A | 5/2000 | Spiess |
| 6,379,139 | B1 * | 4/2002 | Boucherie ................. 425/572 |
| 6,709,251 | B1 * | 3/2004 | Payette et al. ............. 425/576 |
| 6,783,346 | B1 * | 8/2004 | Bodmer et al. ............ 425/576 |

FOREIGN PATENT DOCUMENTS

| EP | 0 287 203 | 10/1988 |
| JP | 07016879 A | 1/1995 |
| WO | 88/00122 | 1/1988 |

* cited by examiner

*Primary Examiner*—Tim Heitbrink
(74) *Attorney, Agent, or Firm*—Young & Thompson (57) ABSTRACT

An injection mold is provided which has a cavity plate, and a core plate. There are one or more insert slots in the cavity plate and the core plate. Each insert slot is capable of receiving an insert. The cavity plate and the core plate also have guide elements thereon, which guide elements are constructed and arranged so that, in use, an insert may be engaged with the guide elements and moved along the guide elements to the insert slot.

10 Claims, 7 Drawing Sheets

QUICK INSERT CHANGE SYSTEM FOR MULTI-MATERIAL PLASTIC INJECTION MOLDS

CROSS-REFERENCE TO RELATED APPLICATIONS

This is the 35 U.S.C. 371 national stage of International Application PCT/NZ02/00032 filed on 14 Mar. 2002, which designated the United States of America.

TECHNICAL FIELD OF THE INVENTION

This invention relates to an injection mold and has been designed in particular to allow injection molding of plastic products utilising two materials.

BACKGROUND ART

Two material injection molding may comprise the injection molding of plastics materials having different characteristics so as to provide a composite product. Two material injection molding may, for example, allow an elastic plastic material to be molded onto a rigid plastic material to improve the feel or touch of the material, allow for absorption of shock and vibration and/or to provide sealing against dust, water and other agents. Other applications of two material injection molding technology includes plastic parts with moveable assemblies, living hinges, decorative features, combinations of transparent and non-transparent areas, different colours and the like.

In two material plastic injection molding technology currently available, commercially available injection molding machines are provided with a mold specifically built for the product. These molds commonly have two internal passages directing the two plastics materials injected by the molding machine to the two mold stations which have been constructed to correspond, or be complementary, to the geometry of the plastic part. Each of the two mold stations is made up of a group of inserts constructed of tool steel to the required geometry. Production of the plastic part involves injecting the first material into the first station and then transferring the partially completed plastic part to the second station where the second material is injected. With such conventional two material injection molding technology, change over of production from one product to another requires replacement of the entire mold and subsequent readjustment of the injection molding machine. Such a process typically takes about four to six hours to complete.

Thus conventional two material injection molding involves two major equipment items. Firstly an injection molding machine with the ability to inject two plastic materials sequentially into a mold, and secondly an injection mold comprising a mold framework and a non-changeable plastic insert made according to the geometry of the two material plastic product. The mold framework, which is commonly known as the mold base, used in such conventional two material injection molding, is essentially the same as those designed for a single material injection molding. The mold base may be mounted on a turntable device built as an integral part of the molding machine. Rotation of the turning device enables two different materials to be injected sequentially into the product inserts thus forming a two material plastic part. Rotation of the turntable thus is about an axis which is transverse to the axis of movement of the moving part of the mold framework.

The principal disadvantage of such constructions is the significant time, as stated above, which it takes to change the two material injection molding device from a first set up to mold a first product to a second set up to mold a second product.

OBJECT

It is therefore an object of the present invention to provide an injection mold which will obviate or minimise the foregoing disadvantages in a simple yet effective manner or which at least provide the public with a useful choice.

DISCLOSURE OF INVENTION

Accordingly in one aspect the invention consists in an injection mold including a cavity plate, and a core plate, one or more insert slots in the cavity plate and the core plate, each insert slot being capable of receiving an insert, the cavity plate and the core plate having guide means thereon, the guide means being constructed and arranged so that, in use, an insert may be engaged with the guide means and moved along the guide means to the insert slot.

Preferably the guide means comprise a channel or channels, or rib or ribs.

Preferably both the cavity plate and the core plate have guide means thereon, both the cavity plate and the core plate being able to receive at least two inserts.

Preferably each guide means comprises a pair of spaced apart mutually inwardly facing channels or channel segments extending in a direction parallel to a line transverse to an axis formed by the movement of mold parts to open and close the mold in use.

Preferably the cavity plate and the core plate each include a removable member which when engaged with the remainder of the cavity plate or core plate closes the channels to substantially prevent movement of an insert into or out of the insert slots.

Preferably one cavity plate is fixed and the core plate is moveable along the axis.

In a further aspect the invention consists in an injection mold as described and a plurality of inserts, the inserts having complementary guiding means thereon to enable the selected insert to be entered into and subsequently removed from an insert slot by engagement of the guide means with the complementary guiding means.

Preferably the complementary guide means comprises a pair of ribs able to engage a channel in the cavity plate.

Preferably the core plate has at least two insert slots and is rotatable about the axis to present a selected core insert to each cavity insert in the fixed cavity plate.

Preferably the core plate and the cavity plate each have the same number of insert slots.

Preferably the core plate is mounted on an axle positioned along the axis and drive means are provided to rotate the axle and thereby to rotate the core plate.

Preferably the drive means comprise a pinion on said axle and at least one moveable rack engaged with said pinion.

Preferably a pair of parallel racks are provided, the pinion being positioned between and engaging each rack.

Preferably the racks are moved by a piston and cylinder assembly.

Preferably each rack is moved by a piston and cylinder assembly arranged to rotate the pinion in an opposite direction.

To those skilled in the art to which the invention relates, many changes in construction and widely differing embodiments and applications of the invention will suggest themselves without departing from the scope of the invention as defined in the appended claims. The disclosures and the description herein are purely illustrative and are not intended to be in any sense limiting.

BRIEF DESCRIPTION OF DRAWINGS

One preferred form of the invention will now be described with reference to the accompanying drawings in which.

BEST MODE FOR CARRYING OUT THE INVENTION

Figure 1:
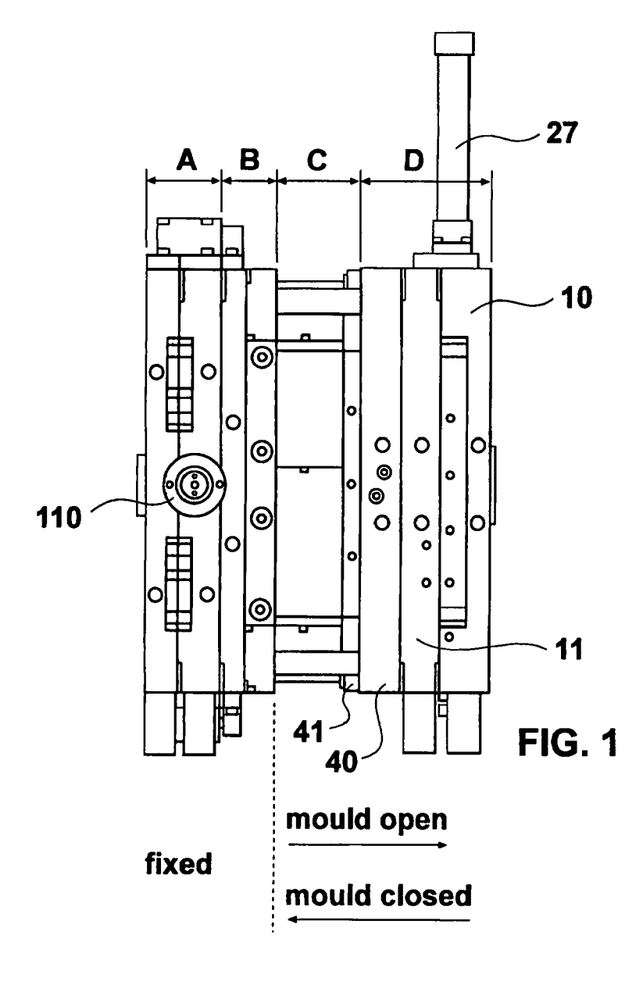
FIG. 1 is a side elevation of a mold according to the invention including injection molds according to the invention.
Figure 2:
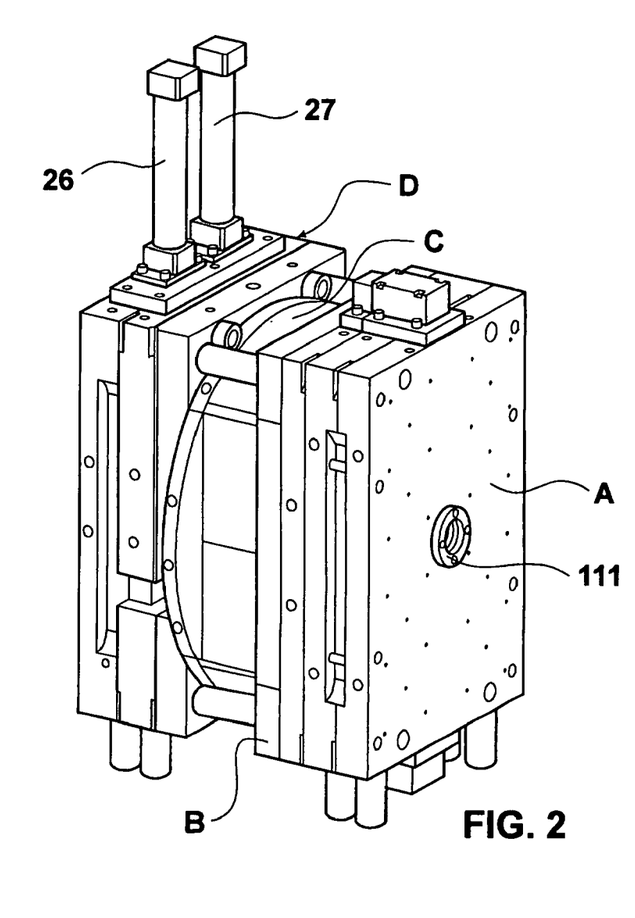
FIG. 2 is a perspective view of the injection mold of FIG. 1, showing in particular a two colour mold.

Referring now to the drawings, FIG. 1 shows an injection molding device. The construction can be for a two-colour product, or other two material products. The region marked "A" shows a manifold plate module, the region "B" shows a fixed cavity plate module, the region "C" shows a rotary core plate module including a rotary core plate and the region "D" shows the hydraulic system.

The region "D" provides rotation of the rotary core plate module "C" and the ejection mechanism for the molded articles. The device is driven by a molding machine (not shown) in use.

Figure 3:
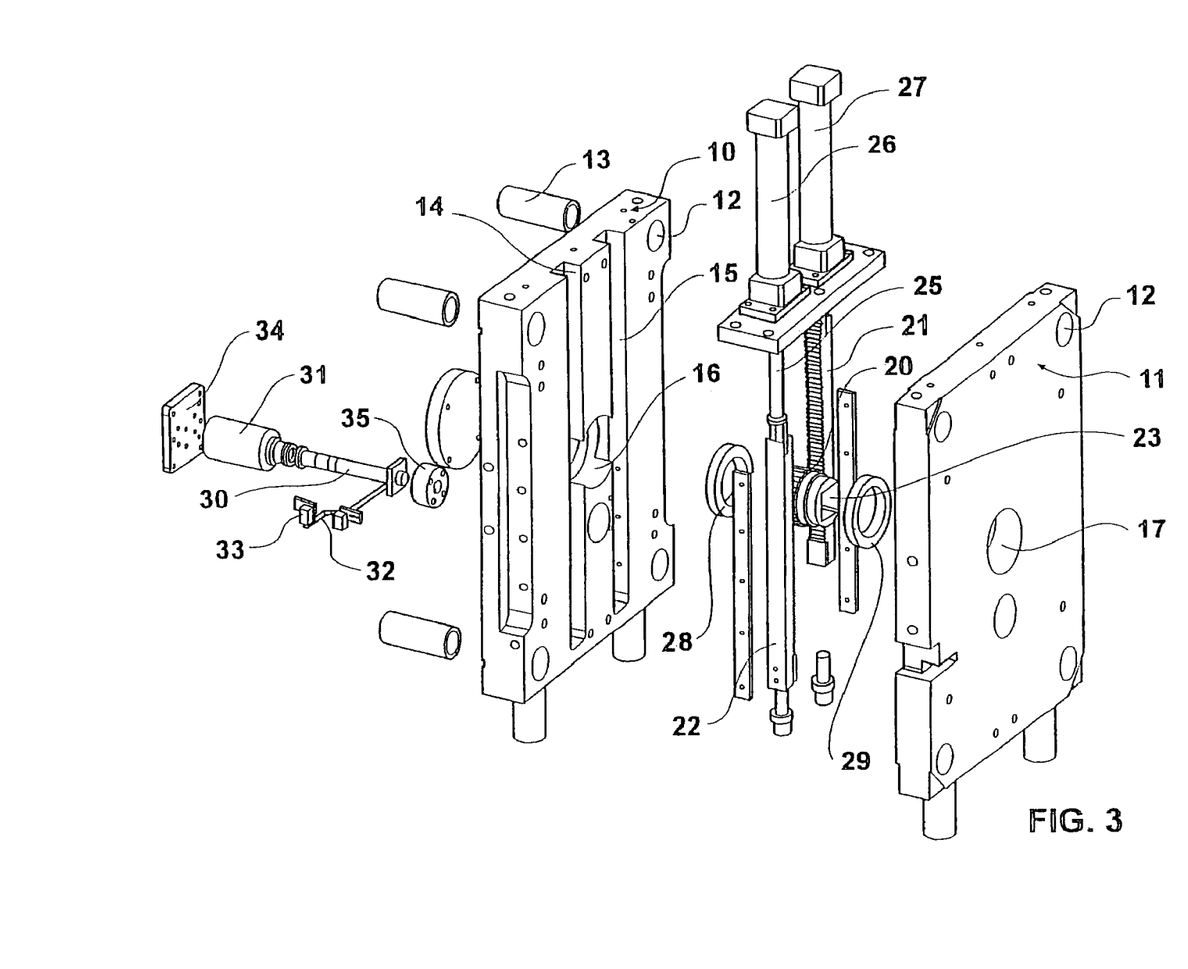
FIG. 3 is an exploded view of a hydraulic system module for use in the injection molding device of FIGS. 1 and 2 to drive and rotate a rotary core plate included in the invention.

The hydraulic system "D" comprises a pair of plates 10 and 11 which are held together by suitable bolts and threaded receiving depressions.

Apertures such as 12 are provided, for example, at or adjacent the corners of the plates 10 and 11 and suitable centering sleeves are provided. A pair of substantially parallel depressions 14 and 15 are provided in the plate 10 along with a central aperture 16. The plate 11 has a corresponding central aperture 17.

The central aperture 16 intersects the channels 14 and 15. Into the aperture 16 is provided a pinion 20 and this is driven by one or more, preferably a pair of racks 21 and 22 which engage each side of the pinion 20. The racks 21 and 22 are each moved by a piston such as piston 25 operating in a cylinder 26 and 27, but in opposite directions, thus together the racks 21 and 22, in one step of the molding cycle rotate the pinion in one direction and in another step of the molding cycle the racks 21 and 22 rotate the pinion in the other direction. Bearings 28 and 29 are positioned in the apertures 16 and 17. The pinion 20 has a central bore 23 or non-round such as square cross section.

The ejection system comprises an axle in the form of a piston 30 and a cylinder 31. Towards the other end of the cylinder is provided an arm mounting sensor pin 32 which is able to become positioned adjacent a proximity switch 33. The construction is mounted on a mounting plate 34. Also mounted about the axle 30 is the cylinder cover 35. The signal from the proximity switch is integrated with the molding machine so that the ejector system extends to eject a completed part.

Figure 4:
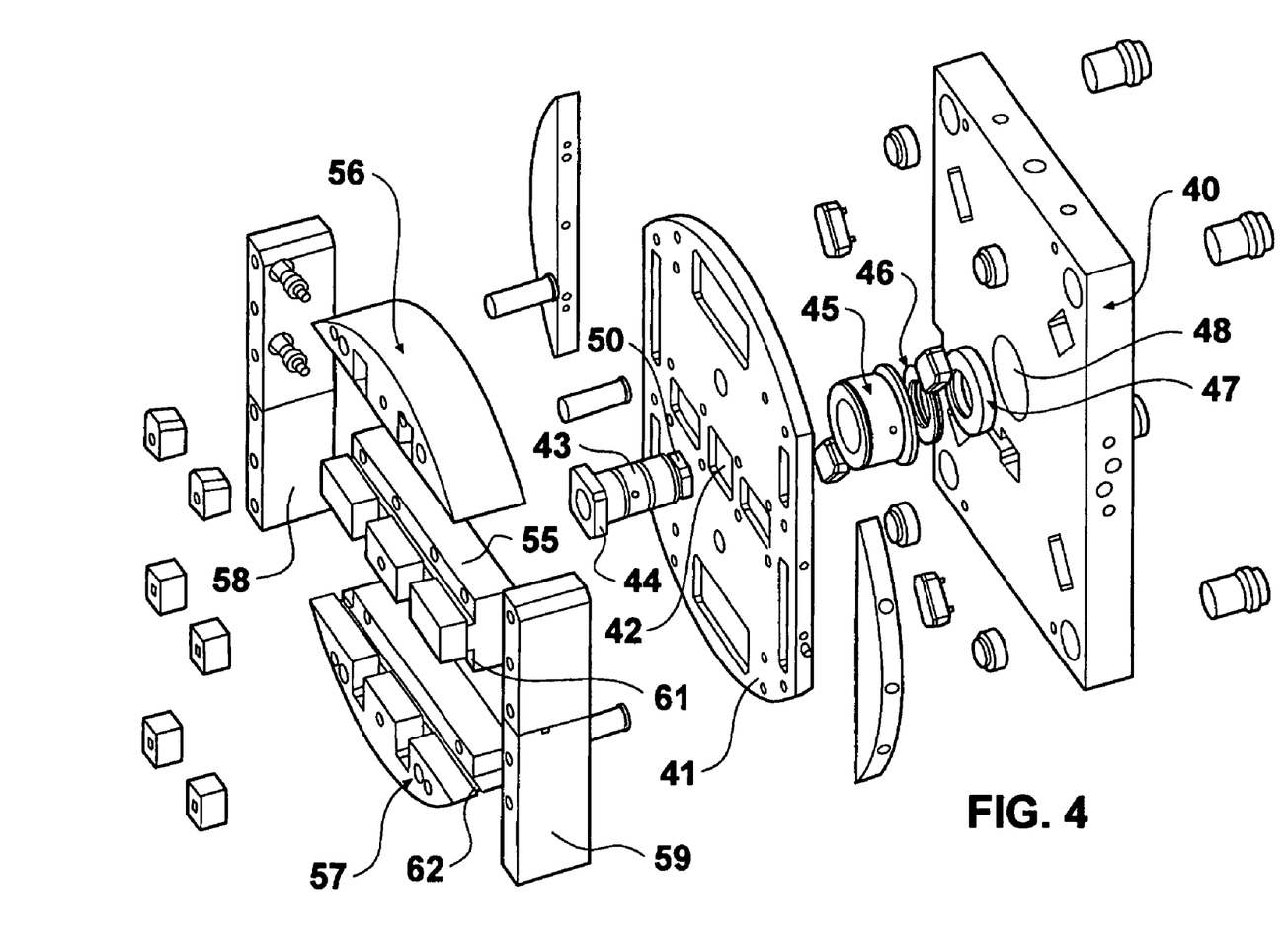
FIG. 4 is an exploded view of a rotary core module for use in the injection molding device of FIGS. 1 and 2, FIG. 5 and FIG. 6 are perspective views of the construction of FIG. 4 showing inserts respectively in place and removed from insert slots in a rotary core plate.

The rotary core plate module at "C" comprises a plate 40 which is engaged with the plate 11. Attached to the plate 40 is a rotatable plate 41 which has a non round, that is to say, preferably rectangular central aperture 42. A shaft 43 is provided with a rectangular end part 44 which is positioned within the rectangular aperture 42. The shaft 43 engages the rectangular bore 23 of the pinion 20. The pistons of the piston and cylinder assemblies 26 and 27 move the pinion 20 which in turn rotates the shaft 43 and in turn rotates the rotatable plate 41.

Thus when the pistons and cylinder assemblies 26 and 27 are operated the effect is to rotate the plate 41.

The plate 41 provides the base of a rotating core plate. The rotating cavity plate may be completed as follows. In the following example, the plate has two insert slots into which inserts can be placed.

The insert slots are provided by a central cross member 55 spaced apart from two end members 56 and 57. End members 58 and 59 complete the insert slot. The end members 58 and 59, or at least one of them, are readily removable, for example, by undoing fixing bolts. Guide means are provided and these, in the preferred form, comprise channels or ribs. In the constructions shown, channels are provided. Thus referring to a lower cavity, channels 61 and 62 are provided along the upper and lower faces. These channels are parallel to a line transverse to an axis formed by shaft 43. Into the upper insert slot similar channels are formed.

Figures 5, 6:
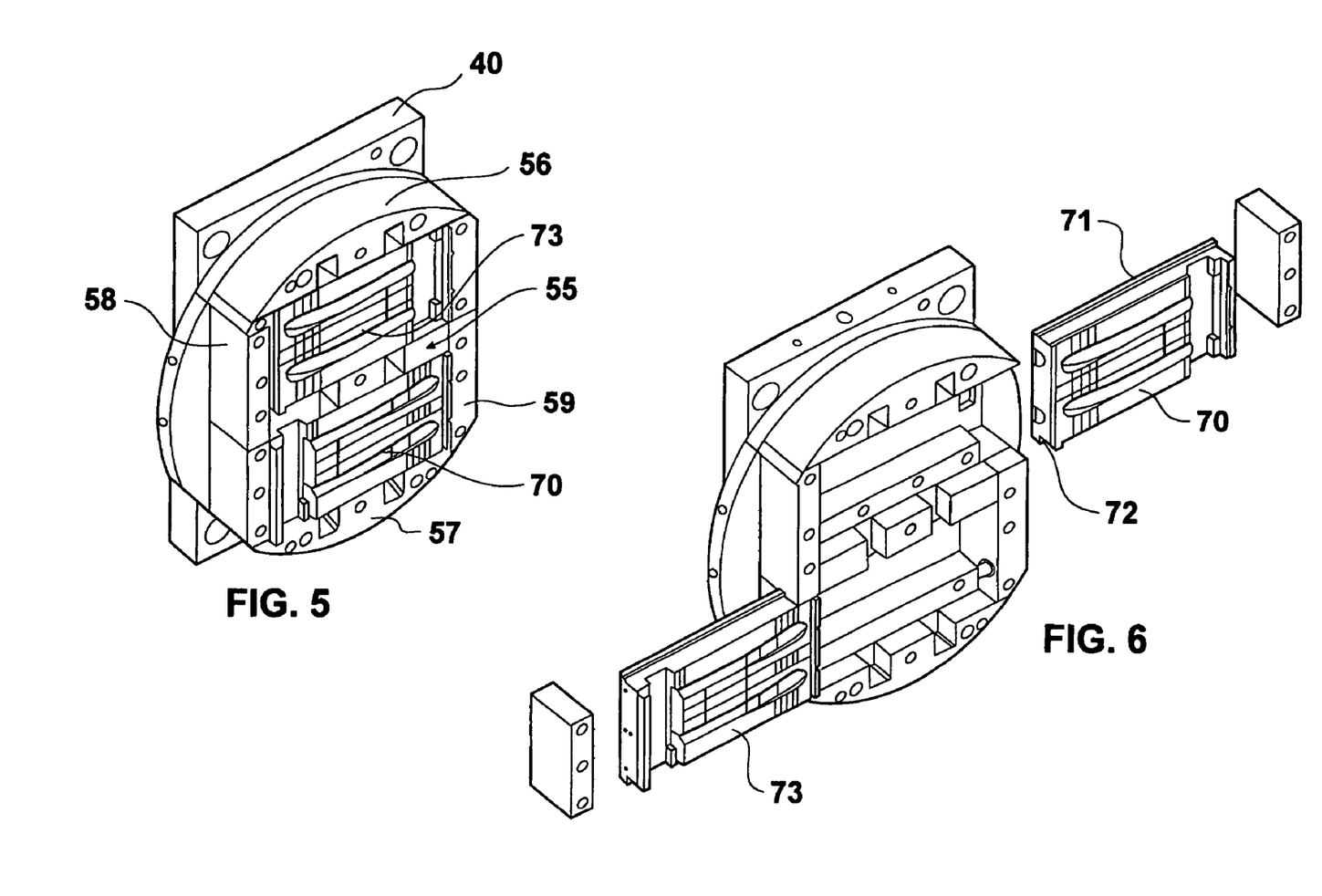

The end members 58 and 59, if desired, may be formed in two pieces as can be clearly seen in FIGS. 5 and 6.

The core inserts each comprise a shaped member. Core insert 70 in FIG. 6 carries cooperating guide means formed in this case by ribs 71 and 72. The other core insert 73 is similarly formed.

Figure 7:
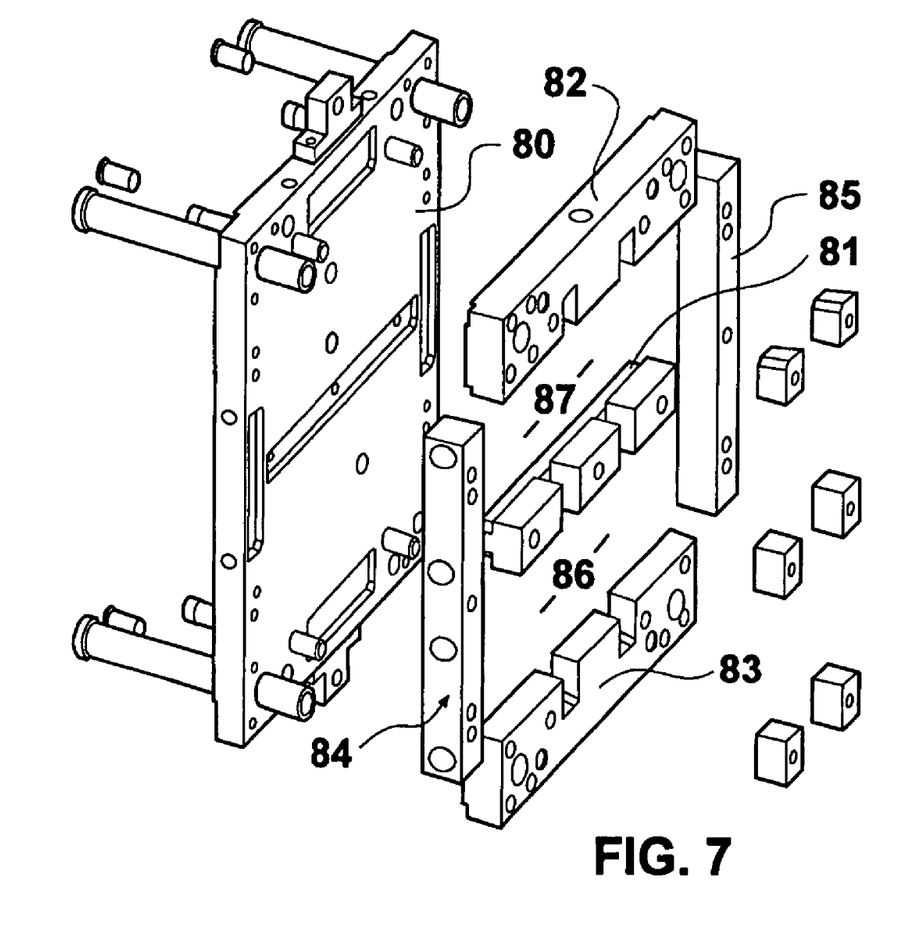
FIG. 7 is an exploded view of a fixed cavity module for use in the injection molding device of FIGS. 1 and 2, FIGS. 8 and 9 are perspective views of the fixed cavity module showing cavity inserts respectively in position and removed.
Figure 8:
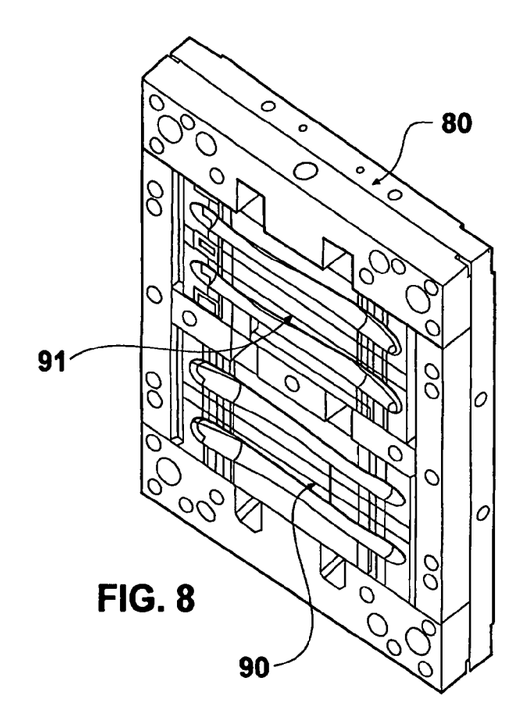
Figure 9:
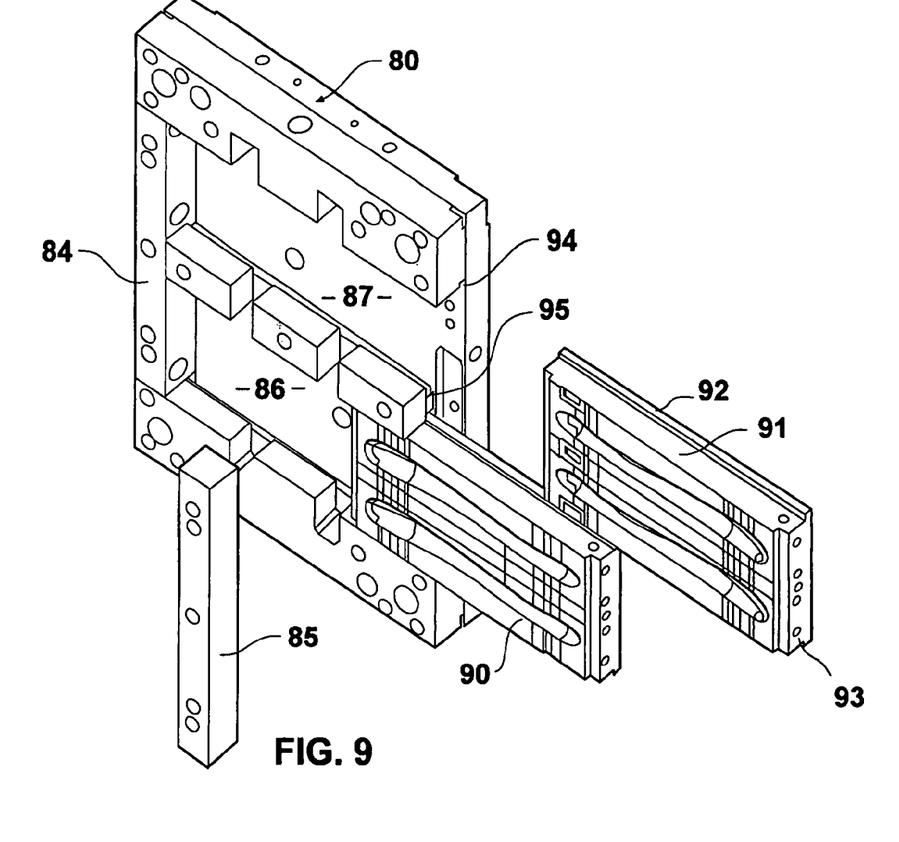

The fixed cavity plate is formed by a base plate 80 onto which a central divider 81 is provided upper and lower cross members 82 and 83 with side members 84 and 85 to form a lower insert slot 86 and an upper insert slot 87 substantially as described for the rotational cavity plate. Cavity inserts 90 and 91 are provided in substantially the same manner, for example, the insert 91 having an upper rib 92 and a lower rib 93 slidable in channels 94 and 95. As can be seen from FIG. 9 the channel 95 is in effect provided in segments as are the central channels shown in FIG. 6. Again the cavity inserts 90 and 91 can be readily removed and inserted by the removal of one or both of the end posts 84 and 85.

Figure 10:
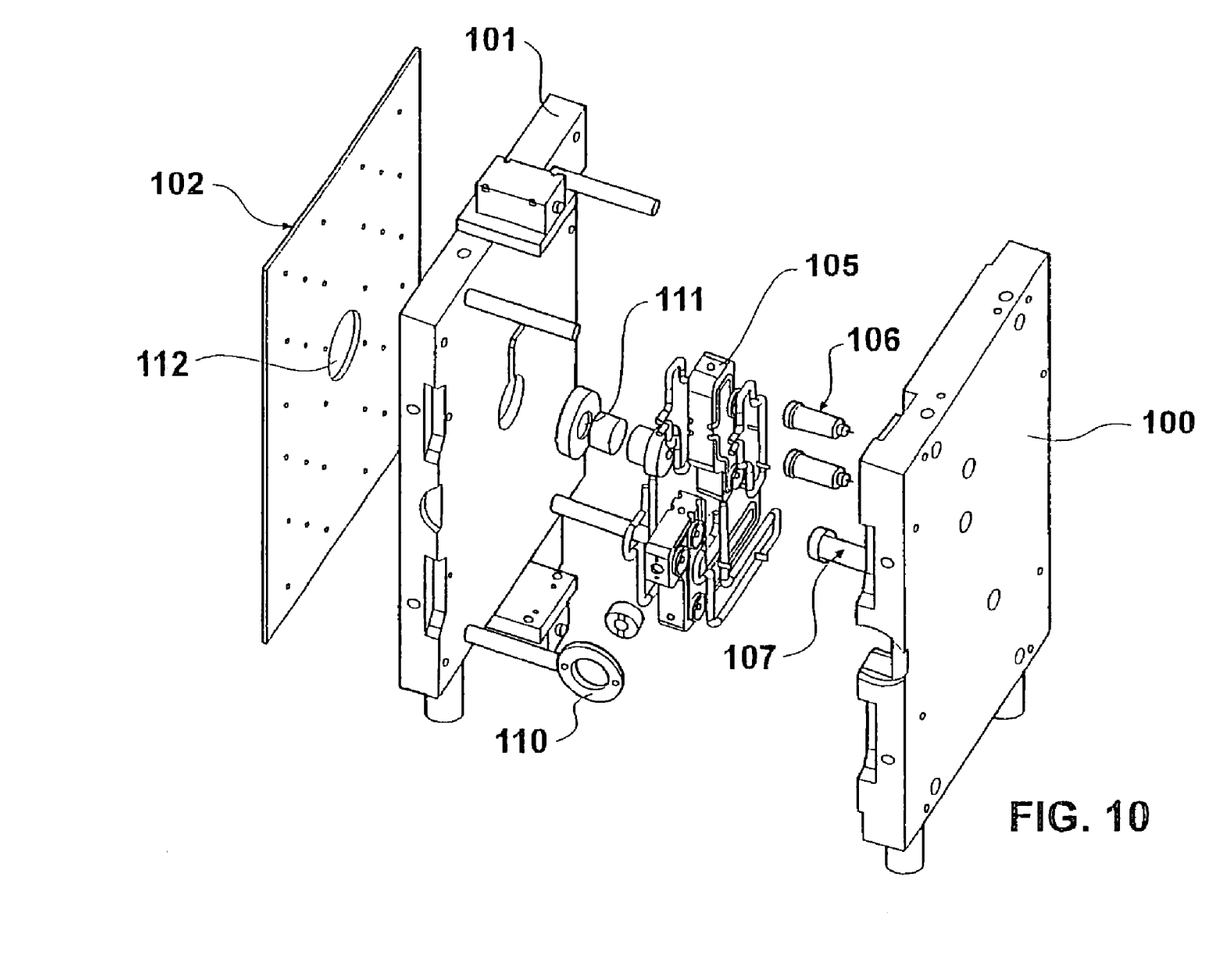
FIG. 10 is an exploded perspective view of a manifold plate module housing a hot runner manifold system.

Referring now to FIG. 10, the manifold plate is shown. This comprises a pair of plates 100 and 101 backed by a thermally insulating plate 102. A plastic injection module or manifold block 105 is provided to feed hot nozzles such as 106 and 107.

The hot runner assembly is substantially standard except for the positioning of the hot runners 106 and 107. One material is injected through insertion point 112 through position 111 and the other through insertion point 110.

Thus, in use, core inserts 70, 73, and cavity inserts 90 and 91 are selected and positioned in the insert slots as above described. The pairs of inserts 70 and 91 and 73 and 90 are arranged so that one pair has more tool metal removed to accept the second material. The molding cycle begins with the injection molding machine in a fully closed position and the first plastics material is injected into one pair of inserts, for example, inserts 73 and 90 through injection point 112, while the second pair of inserts remains unfilled.

The injection molding machine then extends the mold parts "C" and "D" and the pistons and cylinders 26 and 27 are operated as required to move the racks 21 and 22 and in turn the pinion 20 so that the moveable core plate rotates through 180° (in the construction described) and the molding machine moves parts "C" and "D" to close the mold. Second plastics material is then inserted into the pair of inserts 70 and 90, while a first injection of the first material can now be placed into the inserts 73 and 93. The molds are then again opened by the molding machine, the completed plastics item is then removed from insert 70 by the ejection system driven by cylinder 3, and the piston and cylinders 26 and 27 again operated to again rotate the mold through 180° when it is reclosed and an injection of the second material is injected into the pair of inserts 73 and 90 and simultaneously a second injection of the first material is injected into the pair of inserts 70 and 93. The process can then continue.

Thus it can be seen that an injection molding device is provided which has some advantages. In the preferred form a simple mechanism is provided to move the rotary mold between the two required molding stations. It is a particular advantage of the preferred form of the invention that in order to change to mold a second, third or forth different product requires only the removal of a small number of bolted on parts which close the channels into which the inserts run, to allow the inserts to be then removed, replaced and the stock rebolted back into place, this is advantageous. Thus the need to replace the entire mold when changing products is substantially eliminated. This achieves a significant saving in tooling cost. In particular the inserts can be changed in a 20 to 30 minute period rather than the 4 to 6 hours required with prior art devices. Thus end users have advantages gained by the use of reduced tooling cost, as only inserts rather than entire molds need be made for different products, and reduced change over time.

The invention claimed is:

1. An injection mold comprising:
    a cavity plate fixed along an axis, and a core plate moveable along said axis; the moveable core plate and the fixed cavity plate each having the same number of cavities; the moveable core plate being mounted on an axle positioned along the axis, and drive means being provided to rotate the axle and thereby to rotate the moveable core plate; the drive means comprising a pinion on said axle, and at least one moveable rack engaged with said pinion;
    one or more insert slots in the cavity plate and the core plate;
    each insert slot being capable of receiving an insert;
    the cavity plate and the core plate having guide means thereon;
    a plurality of inserts; the inserts having complementary guiding means thereon to enable a selected insert to be entered into and subsequently removed from a cavity by engagement of the guide means with the complementary guiding means;
    the guide means being constructed and arranged so that, in use, an insert may be engaged with the guide means and moved along the guide means to the insert slot; and
    wherein each cavity plate is able to receive at least two inserts.

2. The injection mold according to claim 1, wherein the guide means comprise a channel or channels, or rib or ribs.

3. The injection mold according to claim 1, wherein each guide means comprises a pair of spaced apart mutually inwardly facing channels extending in a direction parallel to a line transverse to an axis formed by the movement of mold parts to open and close the mold in use.

4. The injection mold according to claim 3, wherein the cavity plate includes a removable member, which when engaged with the remainder of the cavity plate closes the channels to substantially prevent movement of an insert into or out of the insert slot.

5. The injection mold according to claim 3, wherein the core plate includes a removable member, which when engaged with the remainder of the core plate, closes the channels to substantially prevent movement of an insert into or out of the insert slots.

6. The injection mold according to claim 1, wherein the complementary guiding means comprise a pair of ribs able to engage a channel in the cavity plate.

7. The injection mold according to claim 1, wherein the moveable core plate has at least two cavities and is rotatable about the axis to present a selected cavity to each cavity in the fixed cavity plate.

8. The injection mold according to claim 1, further comprising a pair of parallel racks; the pinion being positioned between and engaging each rack.

9. The injection mold according to claim 8, wherein the racks are operated by a piston and cylinder device.

10. An injection mold according to claim 9, wherein each rack is moved by a piston and cylinder assembly arranged to rotate the pinion in an opposite direction.

* * * * *